United States Patent Office 3,313,719
Patented Apr. 11, 1967

3,313,719
PROCESS FOR THE PRODUCTION OF PERCHLORINATED OR HIGHLY CHLORINATED 4-ALKYL-1,3-DIOXOLANE-2-ONE
Hermann Springmann and Wilhelm Dietrich, Marl, Germany, assignors to Chemische Werke Huls Aktiengesellschaft, Marl, Germany, a corporation of Germany
No Drawing. Filed Dec. 2, 1963, Ser. No. 327,531
Claims priority, application Germany, Feb. 15, 1963, C 29,168
1 Claim. (Cl. 204—159)

It is known to convert 1,3-dioxolane-2-one into the mono-, di- or tetra-chloro derivative by treatment with chlorine in the presence of actinic light. The reaction can be carried out in the presence or in the absence of solvent.

By the cholorination of substituted 1,3-dioxolane-2-ones such as 4-methyl-1,3-dioxolane-2-one or 4-ethyl-1,3-dioxolane-2-one at temperatures from 35 to 50° C. only unstable chlorine derivatives are formed which at higher temperatures in a further step give unsaturated compounds.

It has now been found that perchlorinated or highly chlorinated 4-alkyl-1,3-dioxolane-2-one is produced in good yield when 4-alkyl-1,3-dioxolane-2-one is treated first at a temperature of from 50 to 80° C. and then at a temperature of from 95 to 130° C. with chlorine in the presence of actinic light.

The 4-alkyl-1,3-dioxolane-2-one starting material can be made by a known process e.g. by reacting 1,2-glycols with phosgene or 1,2-epoxides with carbonic acid. The alkyl group substituted in the 4 position of the 1,3-dioxolane-2-one preferably has a straight chain of from 1 to 10 carbon atoms.

The process is carried out in such a way that chlorine is first introduced into the 4-alkyl-1,3-dioxolane-2-one while it is subjected to actinic light and heated to from 50 to 80° C., preferably 60 to 80° C. until the weight remains constant. Then the temperature is raised to from 95 to 130° C. and chlorine is introduced until there is no further gain in weight. The temperature in the second stage depends upon the particular 4 - alkyl - 1,3-dioxolane-2-one used. With the lower members e.g. 4-methyl-1,3-dioxolane-2-one or 4 - ethyl-1,3-dioxolane-2-one a temperature of from 95 to 110° C. is preferred while with the higher members a temperature of from 120 to 130° C. is preferred. The reaction generally is carried out in the absence of solvent but a solvent such as carbon tetrachloride may be used as diluent.

A catalyst for the reaction is not necessary. The reaction mixture generally is worked up by distillation under partial vacuum. The highly chlorinated and/or perchlorinated 4 - alkyl-1,3-dioxolane-2-ones are recovered as liquids or as almost colorless resins which are soluble in the common organic solvents such as benzene, xylene, acetone, dioxane, butylacetate and tetrachloroethane. The infrared spectrum shows that the dioxolane ring in the chloro derivative is preserved. The chlorinated 4-alkyl-1,3-dioxolane-2-ones obtained by the process of the present invention are useful as pesticides and as herbicides. The compounds containing lower alkyl groups such as hexachloro - 4 - methyl-1,3-dioxolane-2-one can be used as intermediates for further synthesis because these compounds contain a reactive chlorine atom as compared with hydroxyl and amino groups.

*Example 1.—Hexachloro-4-methyl-1,3-dioxolane-2-one*

1020 g. (10 mol) of 4 - methyl - 1,3-dioxolane-2-one were subjected to irradiation with ultraviolet light and at the same time chlorine was introduced for 5 hours while maintaining the reaction mixture at 60° C. The increase in weight during this time was 570 g. Then the temperature was raised to 95–105° C. and the irradiation and introduction of chlorine continued. In 23 hours the increase in weight amounted to 1926 g. The light yellow colored pasty crude product (2946 g.) was vacuum distilled and yielded, after a small forerunning, 2725 g. (90% of theory) of hexachloro - 4 - methyl-1,3-dioxolane-2-one which boiled at 124° C. under a pressure of 9 Torr. (melting point about 74° C.). The distillation residue amounted to 71 g.

Formula: $C_4Cl_6O_3$ (309). Calculated: C, 15.55%; Cl, 68.90%; O, 15.55%. Found: C, 15.65%; Cl, 68.60%; O, 15.60%.

The product is soluble in the usual organic solvents such as benzene, acetone and butylacetate.

*Example 2.—Hexachloro-4-ethyl-1,3-dioxolane-2-one*

754 g. (6.5 mol) of 4 - ethyl-1,3-dioxolane-2-one were treated with cholorine under the conditions described in Example 1 first for 7 hours at 60–70° C. and then for 16 hours at 100–105° C. The gain in weight was 1350 g. The crude product which had a chlorine content of 66.7% by weight was vacuum distilled. At 97° C. and at a pressure of 0.4 Torr. 2040 g. (97% of theory) of colorless liquid hexachloro - 4-ethyl - 1,3-dioxolane-2-one were recovered.

Formula: $n_D^{20}$: 1.5308; $C_5H_2Cl_6O_3$ (323). Calculated: C, 18.60%; H, 0.62%; Cl, 65.90%; O, 14.86%. Found: C, 18.50%; H, 0.62%; Cl, 66.80%; O, 14.80%. Molecular weight 311.

The compound is soluble in acetone, benzene, xylene, dioxane, tetrachloroethane and butylacetate.

*Example 3.—Decachloro-4-n-octyl-1,3-dioxolane-2-one*

Chlorine was introduced into 122 g. of 4-n-octyl-1,3-dioxolane-2-one maintained at 60–70° C. with simultaneous stirring and irradiation with ultraviolet light. After 6 hours the gain in weight was 138 g. The temperature was then raised to 120–130° C. After an additional 18 hours the total gain in weight was 203 g. The product (325 g.) was a clear, pale green resin the formula of which corresponds with decachloro-4-n-octyl-1,3-dioxolane-2-one. It had a softening point of 51° C. The yield was 97.7% of the theoretical yield.

Formula: $C_{11}H_{10}Cl_{10}O_3$ (545). Calculated: C, 24.24%; H, 1.84%; Cl, 65.10%; O, 8.82%. Found: C, 24.26%; H, 1.86%; Cl, 64.80%; O, 8.94%.

The product was soluble in acetone, benzene, xylene, dioxane, butylacetate and tetrachloroethane.

We claim:

Process for the production of a perchlorinated or highly chlorinated 4 - alkyl - 1,3-dioxolane - 2-one which comprises contacting the 4 - alkyl-1,3-dioxolane-2-one with chlorine while irradiating it with actinic light first at a temperature within the range from 50° C. to 80° C. to a substantially constant weight and then continuing the treatment at a temperature within the range from 95° C. to 130° C. to a substantially constant weight.

References Cited by the Examiner
UNITED STATES PATENTS

| | | | |
|---|---|---|---|
| 2,816,287 | 12/1957 | Ellingboe et al. | 204—158 X |
| 2,918,478 | 12/1959 | Newman | 260—340.2 |
| 3,020,290 | 2/1962 | Moss | 204—158 X |

HOWARD S. WILLIAMS, *Primary Examiner.*